United States Patent
Bentaj et al.

(10) Patent No.: US 10,391,677 B2
(45) Date of Patent: Aug. 27, 2019

(54) DEVICE AND METHOD FOR PULSED-POWER RECYCLING OF COMPOSITE MATERIALS WITH REINFORCEMENTS AND MATRIX

(71) Applicant: Camille Compagnie D'Assistance Miniere et Industrielle, Saint Ouen L'Aumone (FR)

(72) Inventors: Abdelaziz Bentaj, Villeneuve la Garenne (FR); Gauthier Demaret, Fourqueux (FR); Mourad Bentaj, Maule (FR)

(73) Assignee: Camille Compagnie d'Assistance Miniere et Industrielle (FR)

( * ) Notice: Subject to any disclaimer, the term of this patent is extended or adjusted under 35 U.S.C. 154(b) by 673 days.

(21) Appl. No.: 14/747,058

(22) Filed: Jun. 23, 2015

(65) Prior Publication Data
US 2015/0375423 A1 Dec. 31, 2015

(30) Foreign Application Priority Data

Jun. 27, 2014 (FR) ...................................... 14 56089

(51) Int. Cl.
*B03B 9/06* (2006.01)
*B02C 19/18* (2006.01)
(Continued)

(52) U.S. Cl.
CPC .............. *B29B 13/00* (2013.01); *B03B 9/061* (2013.01); *B29B 13/08* (2013.01); *B29B 17/02* (2013.01);
(Continued)

(58) Field of Classification Search
CPC ........................ B29K 2105/06; B29K 2707/04
(Continued)

(56) References Cited

U.S. PATENT DOCUMENTS 2,943,174 A * 6/1960 Parker ...................... H05H 1/02
219/121.12
3,133,386 A * 5/1964 Johnston ................. B65B 63/04
198/460.2
(Continued)

FOREIGN PATENT DOCUMENTS

DE 102008062350 A1 6/2010
WO 2005056192 A2 6/2005
(Continued)

OTHER PUBLICATIONS

French Preliminary Search Report for Application No. FR1456089 dated Mar. 18, 2015.

*Primary Examiner* — Ibrahime A Abraham
*Assistant Examiner* — Chris Q Liu
(74) *Attorney, Agent, or Firm* — Lerner, David, Littenberg, Krumholz & Mentlik, LLP

(57) ABSTRACT

The present invention relates to a device for recycling carbon fibers (5), which includes two metal rails (1, 2) between which the carbon fibers (5) are intended to be stretched, and a current generator (3), the terminals of which are connected or intended to be connected to the two metal rails (1, 2). The rails (1, 2) form electrodes (1, 2) in short circuit when the carbon fibers (5) are arranged on said rails (1, 2). The generator (3) is suitable for outputting at least one current pulse of a power in the order of or greater than the MW between these two rails (1, 2), which allows the separation of the fibers from their resin.

A recycling method implemented with this device is also proposed.

6 Claims, 5 Drawing Sheets

(51) Int. Cl.
  B29B 17/02 (2006.01)
  B29K 105/06 (2006.01)
  B29B 13/00 (2006.01)
  B29B 13/08 (2006.01)
  B29L 31/00 (2006.01)
  B29K 707/04 (2006.01)

(52) U.S. Cl.
  CPC .... *B02C 2019/183* (2013.01); *B29K 2105/06* (2013.01); *B29K 2707/04* (2013.01); *B29L 2031/731* (2013.01); *Y02W 30/521* (2015.05); *Y02W 30/622* (2015.05)

(58) Field of Classification Search
  USPC ....... 219/700, 678–679, 680, 682, 686, 690, 219/708, 761, 762; 373/39, 47, 147; 198/371.1, 577; 21/686, 121.12, 121.26, 21/121.52, 121.6, 121.85, 390, 405, 411, 21/678, 680, 681, 700, 748, 761
  See application file for complete search history.

(56) References Cited

U.S. PATENT DOCUMENTS

| | | | | |
|---|---|---|---|---|
| 3,208,674 A | * | 9/1965 | Bailey | B02C 19/18 166/248 |
| 3,846,335 A | * | 11/1974 | Bunn | C02F 1/681 502/402 |
| 4,313,573 A | * | 2/1982 | Goldberger | B02C 19/18 241/1 |
| 4,540,127 A | * | 9/1985 | Andres | B02C 19/18 241/1 |
| 5,607,710 A | * | 3/1997 | De Ruyter | A23J 3/227 219/678 |
| 6,207,939 B1 | * | 3/2001 | Allaire | H02G 7/16 174/40 R |
| 6,965,092 B2 | * | 11/2005 | Mahawili | H01L 21/67115 118/50.1 |
| 7,868,273 B2 | * | 1/2011 | Ganghofer | H01Q 3/267 219/678 |
| 7,946,136 B2 | * | 5/2011 | Watkinson | C03B 5/26 219/678 |
| 2010/0058646 A1 | * | 3/2010 | Scholz | A01M 1/04 43/112 |
| 2011/0057341 A1 | * | 3/2011 | Meier | B29B 17/02 264/37.28 |
| 2012/0117854 A1 | * | 5/2012 | King | A01M 1/223 43/112 |
| 2013/0316051 A1 | * | 11/2013 | van der Voort | H05B 6/54 426/234 |

FOREIGN PATENT DOCUMENTS

| | | |
|---|---|---|
| WO | 2009135486 A1 | 11/2009 |
| WO | 2013168302 A1 | 11/2013 |

* cited by examiner

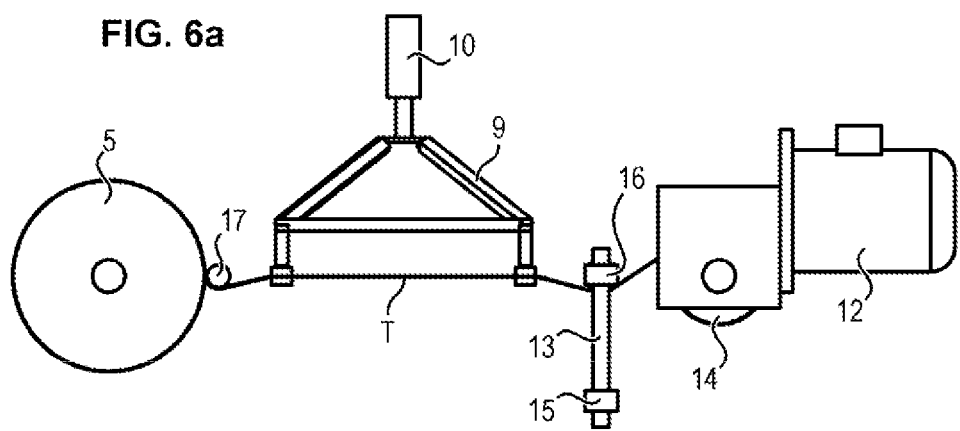
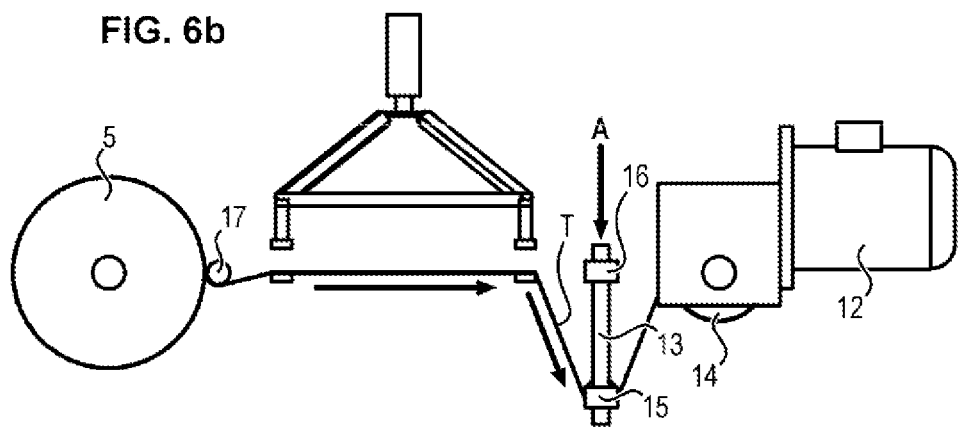
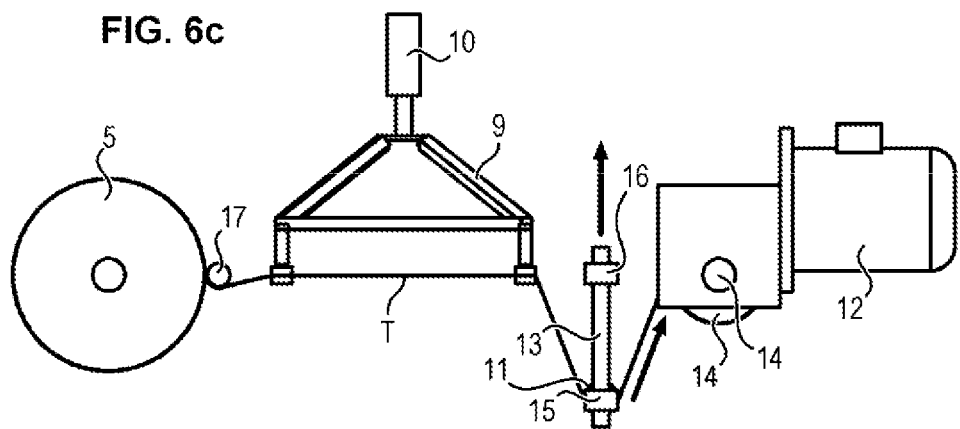

DEVICE AND METHOD FOR PULSED-POWER RECYCLING OF COMPOSITE MATERIALS WITH REINFORCEMENTS AND MATRIX

FIELD OF THE INVENTION

The present invention generally relates to the recycling of reinforcements/matrix-based composite materials.

In particular it proposes a device and method of reinforcement/matrix recycling by injecting a strong pulsed current through the composite, and can advantageously be used in the recycling of carbon fiber-based composite materials.

TECHNOLOGICAL BACKGROUND

It is known that carbon fibers have particularly beneficial mechanical properties, particularly in terms of strength, Young modulus and density. Because of this they are increasingly used in aeronautics or related fields (fabrication of wind turbine blades of large span and low weight, for example) or for manufacturing sports equipment.

The worldwide carbon fiber production capacity was of 111 785 tons in 2012. It will reach 156 845 t in 2016 and 169 300 t in 2020. Actual production is only a part of these nominal capacities, evaluated at 60% in 2012, 68% in 2016 and 72% in 2020. Demand, meanwhile, was of 47 220 t in 2012. It should reach 74 740 t in 2016 and 102 460 t in 2020. This situation of overcapacity could help maintain competitive prices. The matrices of carbon fiber composites are 72% epoxy (Source: PlusComposites Consortium).

In 2012, 16% of demand comes from aeronautics, 62% from industry, and the rest from other sectors (consumer).

Consequently, carbon fiber recycling is now becoming a major challenge.

A composite material has assets that its components do not have on their own: strength, lightness, thermal insulation, new chemical and mechanical properties, etc.

This performance of course results from the nature of the base materials (reinforcement, matrix and their compatibility). This product is adaptable to innovations and enables the creation of new markets.

Composite materials are thus composed of a reinforcement and a matrix.

The reinforcement gives the composite mechanical strength, and can be carbon fiber, glass fiber, Kevlar, aluminum or titanium.

The matrix generally used in the fabrication of the composite is an epoxy resin, and carbon, polyester, vinyl ester or polyamide are also generally used. The matrix, thermosetting or thermoplastic, allows the transfer of forces to the reinforcement, which is more rigid and stronger.

In aeronautics, high-performance reinforcements are used, with matrices of equally high performance.

However, the main techniques of recycling/re-use of composite materials known to date are not completely satisfactory.

In particular, incineration techniques do not allow for the recovery of materials; they generate toxic gases and allow at best a re-use of energy.

Techniques of pyrolysis (thermal treatment of waste, at controlled temperature and pressure) and solvolysis (water, methanol etc.) in supercritical conditions make it possible to break down resins or to separate them from fibers. They nonetheless remain particularly energy-hungry. In addition, the fibers are broken down on the surface from 500° C., and their mechanical properties are thereby reduced.

The Applicant has already proposed (in her patent FR 2 942 149 in particular) a recycling method that can be used for various types of composite material and for carbon fibers in particular. This method employs several successive treatment stages:
- an indirect-effect stage with generation of a mechanical shockwave,
- a direct-effect stage with an electric arc, creating an electromagnetic pulse that crosses the bath in which the material to be re-used is located, and lastly
- a stage of microwave drying.

PRESENTATION OF THE INVENTION

A general aim of the invention is to propose a technique of re-use and treatment of composite materials of reinforcement/matrix type (in particular—but not limited to—carbon fibers), which is simple, reliable, low-pollution and with low energy consumption.

For this purpose it proposes a recycling device, which includes two metal rails between which the composite materials to be recycled are intended to be stretched, and a current generator, the terminals of which are connected or intended to be connected to the two metal rails.

Said rails also form electrodes in short circuit when the composite materials to be treated are arranged on said rails.

The generator is suitable for outputting at least one current pulse of a power in the order of or greater than the MW between these two rails, which allows the separation of the reinforcements from their matrix.

The invention further proposes a recycling method using such a device. This method includes the steps of:
i. placing a quantity of composite materials of reinforcement/matrix type to be recycled between the two rails of said device,
ii. controlling the generator of said device so that it outputs at least one current pulse of a power in the order of or greater than the MW between these two rails, which allows the separation of the reinforcements from their matrix.

BRIEF DESCRIPTION OF THE DRAWINGS

Other features, aims and advantages of the present invention will become more apparent on reading the following detailed description, and on referring to the appended drawings given way by of non-limiting example and wherein:

FIGS. 6a to 6c illustrate various steps of operation of the system in FIG. 5.

DETAILED DESCRIPTION OF AN EMBODIMENT

Figure 1:
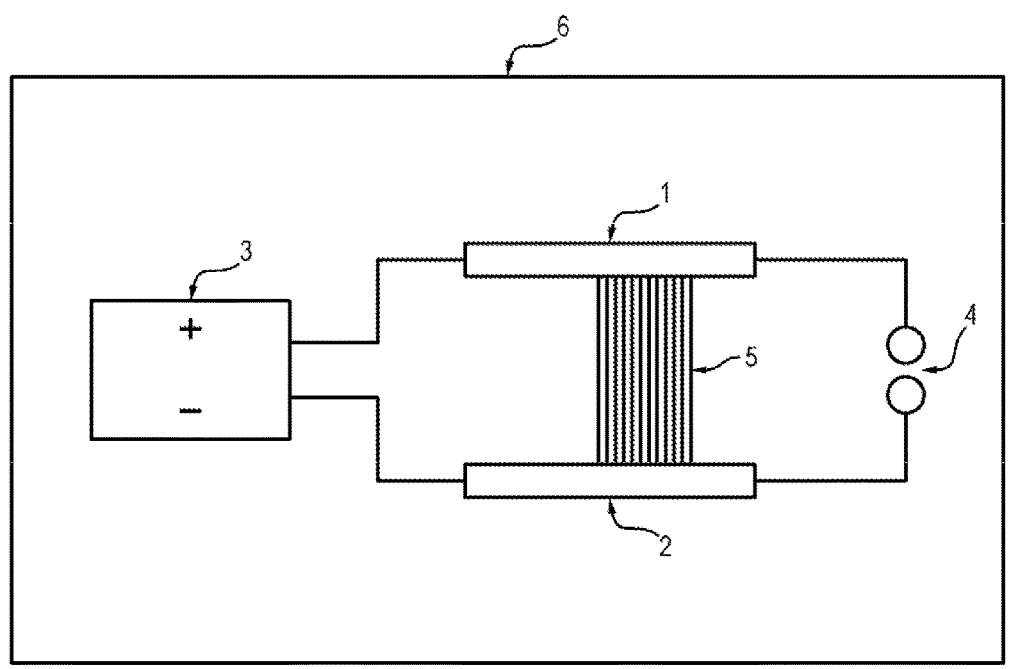
FIG. 1 is a schematic representation of a possible embodiment of a device in accordance with a possible embodiment of the invention.
Figure 2:
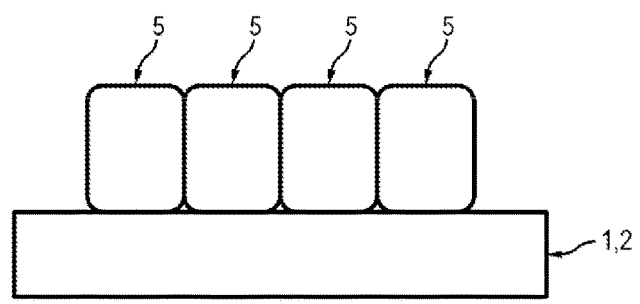
FIG. 2 is a section view illustrating an arrangement of carbon fibers on the electrode-forming rails of the device in FIG. 1.

The re-use device illustrated in FIG. 1 comprises two metal rails 1 and 2 which form two electrodes, and a current generator 3 which is meant to generate high-power pulses between these two rails 1 and 2.

The two rails 1 and 2 run at a certain distance from each other. They are intended to be short-circuited by the composite materials of reinforcement/matrix type to be recycled, which are for example carbon fiber materials 5.

Said rails 1 and 2 can be straight and run parallel. They can also run in other configurations, for example they can have different areas of different spacing in order to receive different lengths of fibers/materials to be recycled.

An arrester 4 can also be provided between rails 1 and 2 to make the device safe.

The spacing between the two electrodes 1 and 2 can vary from a few cm to about 2 m, the composite materials 5 being able to be oriented in any direction between these electrodes. As the reader will have understood, the greater the pulsed current passing through the fiber, the greater the length of fibers (more generally composite materials) that can be treated.

External handling means are provided to make it possible to place the materials 5 to be recycled on rails 1 and 2, whatever their orientation on the latter.

To produce discharges of very high current, the generator 3 includes high-voltage capacitors allowing it to store electric energy without requiring a high supply power. The energy thus stored is output by a rapid switching system.

Figure 3:
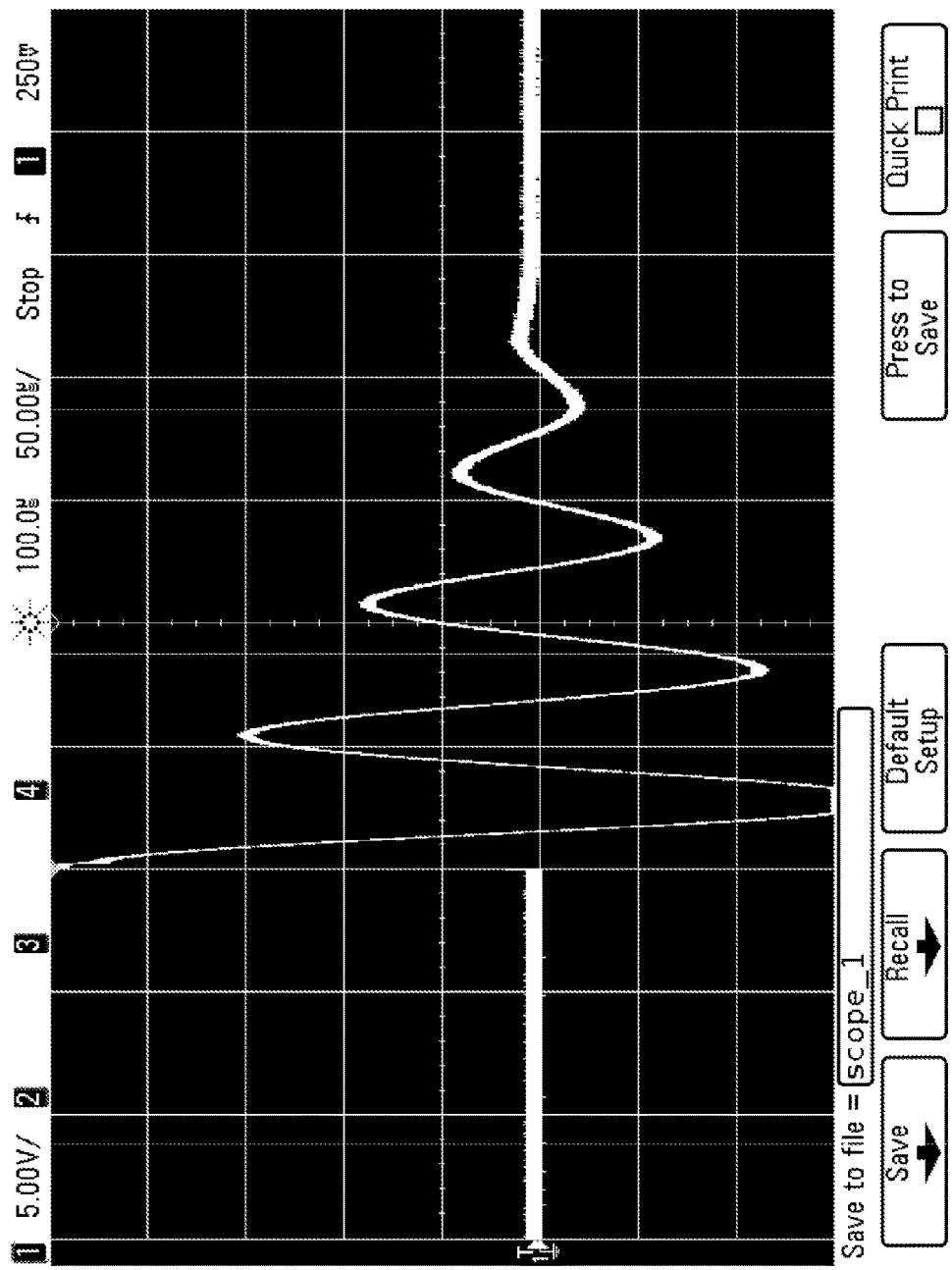
FIG. 3 illustrates an example of a voltage pulse delivered by the device in FIG. 1.

The current generator 3 generates current pulses, of positive or negative polarity, of square shape or damped sinusoidal shape of the type represented in FIG. 3.

These pulses are of a power in the order of MW, or even a good deal above (between $10^6$ and $10^{14}$ W).

They correspond for example to a maximum voltage between electrodes 1 and 2 ranging from 20 kV to 200 kV.

The mean duration of a pulse is about 50 μs.\

The discharge frequency (a priori without any great effect on the separation phenomenon) is between 15 and 300 kHz.\

The current between rails 1 and 2 ranges from 10 to 100 kA according to the generator configuration.

Moreover, the quantity of composite materials 5 arranged on the electrodes 1 and 2 and treated simultaneously is adapted to allow the treatment to be as efficient as possible. This quantity and the current passing through the materials to be recycled are heavily dependent. In the case of composite materials, for example, the current density in the fibers 5 must be in the order of or greater than $10^4$ A/cm² in order to separate the fibers from their resin with a single discharge. Several discharges are required when the current density is insufficient.

The current tends to flow around the periphery due to the skin effect. However, when the current becomes too high, the quantity of current flowing inside the fiber increases. In experiments, fiber/resin separation is observed when the current at the center of the fiber exceeds a certain value. The pulsed current then passes through all the strands of the fiber.

By crossing the results of the fiber/resin separation obtained experimentally with the current density inside the fiber calculated by simulation with the Quickfield™ software program, the following energy ratio is observed:

| Maximum current density Jmax Cross section = Width × Height | Energy spent/ Fiber-resin separation ratio |
| --- | --- |
| Jmax > 1000 A/mm² | Very good |
| 650 < Jmax < 1000 A/mm² | Good |
| 300 < Jmax < 650 A/mm² | Average |
| 100 < Jmax < 300 A/mm² | Poor |
| Jmax < 100 A/mm² | / |

For a same cross section of fiber, the greater the peak current of the discharge, the better the result. Furthermore, a current density threshold exists below which the separation phenomenon no longer occurs, or is not satisfactorily obtained (in this case 300 A/mm² for carbon fibers).

The separation phenomenon takes place according to the cross section of fiber to be treated, the number of discharges required for the separation then increases in proportion with the length of fiber to be treated.

In the table above, the current density Jmax running through a cross section of fiber is calculated using the following formula:

$$Jmax = \frac{Idischarge}{S}$$

Jmax: Current density (A/mm²)
$I_{discharge}$: Peak current (Ampère)
S: Cross section (mm²)=Width (mm)×Height (mm), conductive cross section connected to the electrodes 1 and 2.

The obtained Jmax value thus makes it possible to estimate the ease of fiber/resin separation, and to see what the pulsed current required for the treatment of a given cross section of fiber would be.

It is noted that for an identical quantity of treated fiber, the energy balance is better when the cross section is small in relation to the length.

It was also seen in experiments that the separation is improved when the fiber is compacted, i.e. when the width is close to the height (fiber of square cross section).

The current passing through the fiber strands then makes it possible to extract the resin from the carbon fiber, the fiber strands becoming caught on the electrodes 1 and 2 while the resin itself is released and can be recovered.

Provision is also made for a protective enclosure 6 of insulating plastic material.

This enclosure 6 has several functions:
protecting the user, given the high applied voltages inside the device; it is therefore an essential safety component for the operator,
collecting the fiber deposits as it can be noted that the resin is redeposited across the walls of the enclosure 6.
using a Newtonian or non-Newtonian fluid during the treatment, it being possible to conduct the operation in a liquid or neutral gas for example.

Figure 4:
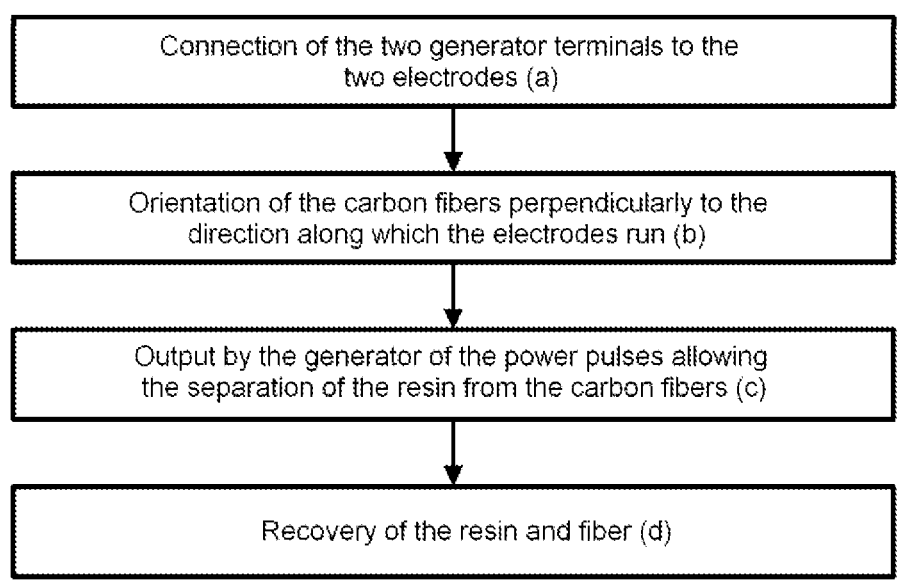
FIG. 4 illustrates various steps of a possible implementation for the method of the invention.
Figure 5:
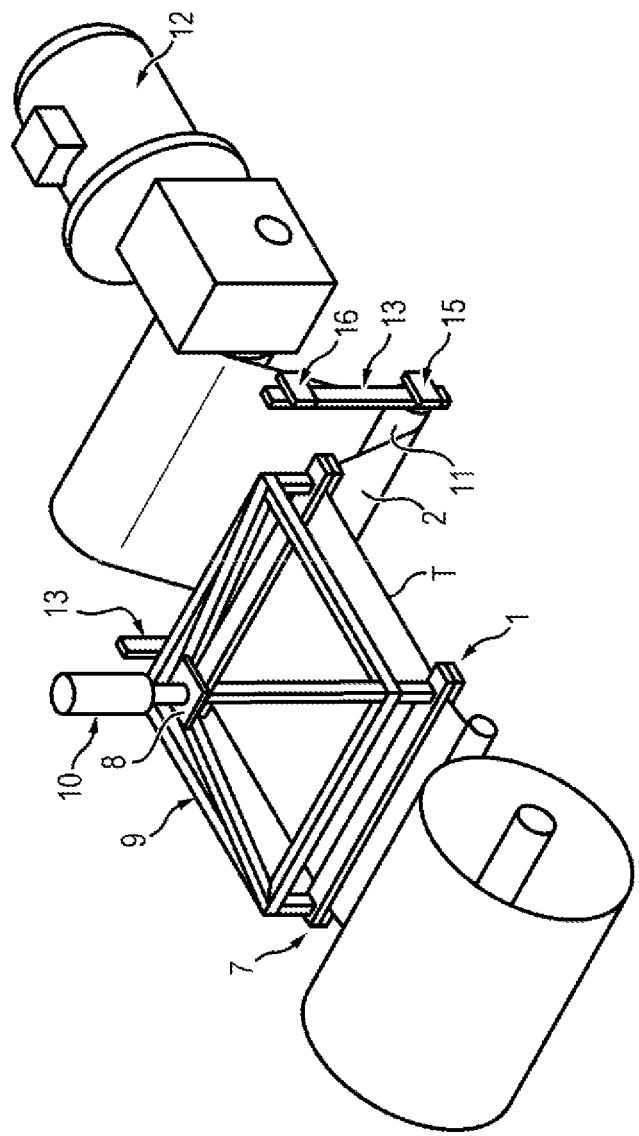
FIG. 5 illustrates an example of a mechanization system, making it possible to continuously treat fibers to be recycled.

FIG. 4 illustrates the various steps of a recycling treatment by means of a device of the type that has just been described.

In an initial step (step a) in FIG. 4, the operator connects the two terminals of the generator 3 to the two electrodes 1 and 2.

Using handling means provided for this purpose, he or she places the carbon fibers 5, regardless of the orientation taken by the fibers, between electrodes 1 and 2 so that they make a short circuit between the latter (step B). Once the fibers 5 are in place, the operator switches on the generator 3 which charges up and outputs the strong current pulses that will allow the separation of the resin from the carbon fibers (step C).

Lastly, in a final step, the method comprises the recovery of the resin and the fiber (step D). To do this, the operator recovers the resin spattered across the enclosure 6 after the passage of the electric current and recovers the fibers which have remained caught on the electrodes 1 and 2.

FIG. 5 and FIGS. 6a to 6c illustrate an example of a mechanical system that can be used in a device of the type of those envisioned with reference to the previous figures, to treat a roll of web T of carbon fibers 5 or more generally of composite material with a reinforcement and matrix.

This system incorporates two rails 1 and 2 intended to form an electrode, on which the web of the material to be recycled is unrolled. Two clamping blocks 7 and 8, in addition to rails 1 and 2, are provided to close on these two rails 1 and 2 in order to keep the web stretched between the two rails during electrical arc treatment. These two clamping blocks 7 and 8 are specifically mounted on a supporting structure 9, itself mounted on a jack 10. This jack 10 is capable of being controlled to close the clamping blocks 7 and 8 on the rails 1 and 2 and thus clamp the web, or on the contrary to raise said clamping blocks 7 and 8 off the rails 1 and 2 and release the web T.

The system also consists in a supply roll 11 and a geared motor 12 at the end of rails 1 and 2. The supply roll 11 is mounted between two vertical guides 13 that allow it to unroll, under its own weight, between an upper position and a lower position and thus to drive the web T when the clamping blocks 7 and 8 are raised. The geared motor 12 meanwhile drives a roll 14 on which the web T winds itself back, which then has the effect of rolling up the roll 11.

The operation of this system is as follows.

The roll of web T is charged, passed over the rails 1 and 2, the supply roll 11 and the roll 14, then stretched. The jack 10 brings down the structure 11 and closes the clamps 7 and 8 on rails 1 and 2, in order to clamp the web T between said rails 1 and 2 (FIG. 6a).

One or more current pulses are then generated between the two electrodes 1 and 2 in order to recycle the web T.

After treatment, the clamps 7 and 8 are raised again. The roll 11 then unrolls and drives the web T by its own weight. The upstream reel empties, a brake roll 17 being however provided to achieve good web tension.

When it is detected in the lower position by the sensor 15, the jack 10 brings down the structure 11 and recloses the clamps 7 and 8 on rails 1 and 2. The geared motor 12 is then operated to wind the web T on the roll 14. It stops when the sensor 16 is activated, while the roll 11 is returned to the upper position.

The invention claimed is:

1. A device for recycling composite materials comprising reinforcements and a matrix, wherein the device comprises:
    two metal rails, wherein the rails are parallel, or have areas of different spacing in order to receive different lengths of materials to be recycled;
    a current generator connected to the two metal rails such that a short circuit is formed when the composite material is stretched between the two metal rails and a current is applied by the current generator; and
    a mechanical system configured to automatically unrolling a roll of the composite material onto the two metal rails,
    wherein said generator being configured to outputting at least one current pulse of a power of equal to or greater than one MW between the two rails, so as to allow for the reinforcements of the composite material to be separated from the matrix of the composite material,
    wherein the mechanical system further comprises:
        a supply roll configured for receiving the composite material after it has passed through the two metal rails, wherein the supply roll is mounted between two vertical guides and wherein the supply roll can move in a vertical direction between an upper position and a lower position,
        a receiving roll configured for receiving the composite material after passing the supply roll; and
        a geared motor that operates to wind the composite material onto the receiving roll, wherein
        the supply roll is driven toward the upper position as the geared motor operates to wind the composite material onto the receiving roll.

2. The device according to claim 1, wherein a spacing between the two rails is between 10 cm and 2 m.

3. The device according to claim 1, wherein the generator is suitable for generating current pulses of 10 kA to 100 kA.

4. The device according to claim 1, wherein the generator is suitable for generating pulses of a mean duration in the order of 50 μs between the rails.

5. The device according to claim 1, further including an enclosure made of an insulating material for recovering the matrix.

6. The device according to claim 1, further including a safety spark-gap mounted between the two rails.

* * * * *